Dec. 22, 1931.   S. L. TAYLOR   1,837,596
VEHICLE BODY
Filed Nov. 28, 1930   2 Sheets-Sheet 1
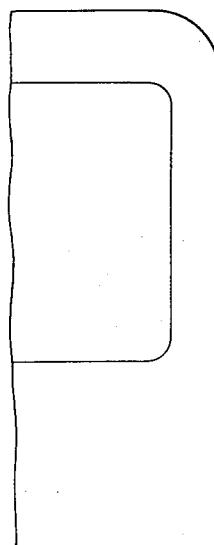
Inventor
Samuel L. Taylor Dec. 22, 1931.  S. L. TAYLOR  1,837,596
VEHICLE BODY
Filed Nov. 28, 1930   2 Sheets-Sheet 2
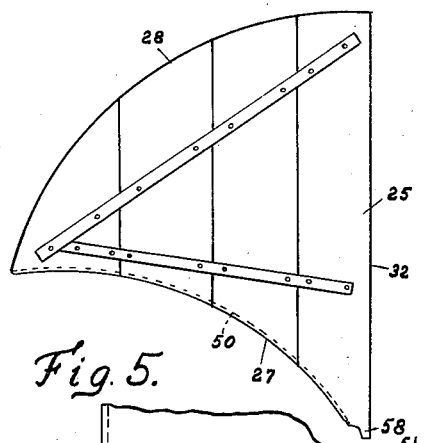
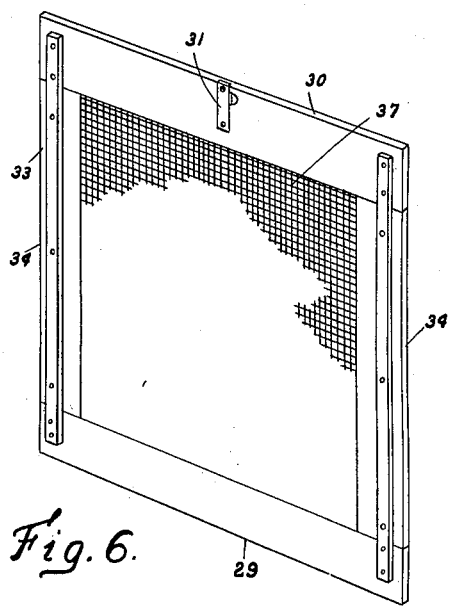
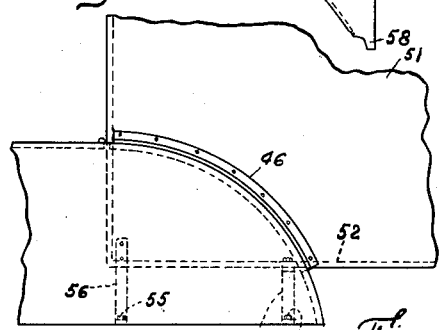
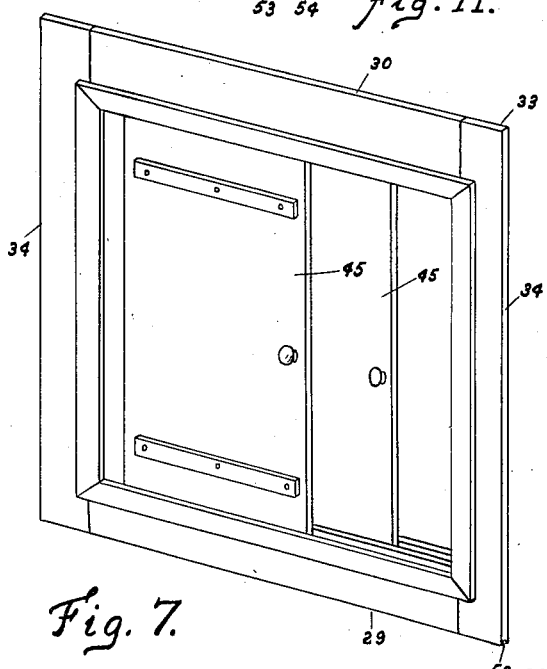
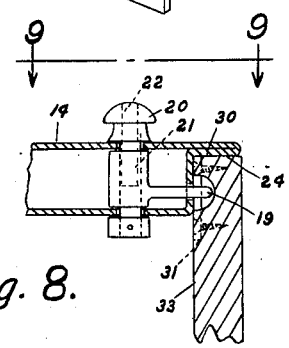
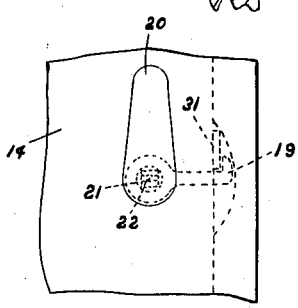
Inventor
Samuel L. Taylor Patented Dec. 22, 1931

1,837,596

UNITED STATES PATENT OFFICE

SAMUEL L. TAYLOR, OF MOUNT STERLING, KENTUCKY

VEHICLE BODY

Application filed November 28, 1930. Serial No. 498,576.

This invention relates to a vehicle body such as may be applied to the rear storage compartment of a pleasure vehicle such as a coupé or roadster.

An object of the invention is to utilize the water carrying channels in the rear storage compartment of a vehicle, for detachable mounting of a commercial or delivery body.

Another object is to provide a delivery body which can readily be applied or removed, and which will be weather-proof.

Another object is to utilize the regular lock and latch handle of the compartment lid, for locking the delivery body in position.

A further object is to construct the device so that any suitable type of closure or door may be provided for permitting access to the body interior.

Another object is simplicity and elimination of parts.

These and other objects are attained by the means described herein and disclosed in the accompanying drawings, in which:

Fig. 1 is a side elevational view of a vehicle with the delivery body attached, part being broken away.

Fig. 2 is a cross sectional view taken on line 2—2 of Fig. 1.

Fig. 3 is a cross-sectional view taken on line 3—3 of Fig. 1.

Fig. 4 is a rear elevational view taken on line 4—4 of Fig. 1.

Fig. 5 is a plan view of a side member of the body.

Fig. 6 is an isometric view of one form of rear panel forming part of the body.

Fig. 7 is a view similar to that of Fig. 6, showing a modified form of rear panel.

Fig. 8 is a cross-sectional detail view showing the use of the regular locking latch of a vehicle rear compartment door for engagement with a cooperative latch means on any one of the rear panels of the device of invention.

Fig. 9 is a plan view taken on line 9—9 of Fig. 8.

Fig. 10 is a cross-sectional view showing a modified form of construction.

Fig. 11 is an elevational view of a modified form of the invention.

The vehicle body 12 of Fig. 1 may be of the coupé or roadster type, in which is provided a rear compartment 13 having the usual door 14 hinged at 15 to the body. The compartment is provided with the usual interior arcuate rain or water carrying channels, those at the sides of the compartment being indicated by 16. The top channel is represented at 17 and the bottom channel at 18, and each extends across the width of the compartment. The door 14 is provided with a hook shaped latch means 19 operated by means of a handle 20 including a key operated lock indicated diagrammatically by character 21. At 22 is represented an opening for reception of a suitable key for operating the lock. As indicated in Fig. 3, the sides of door 14 are provided with inverted U-shaped arcuate channels 23, and the outermost or free rear edge of the door has a ledge 24, (Figs. 1 and 8).

The foregoing completes the description of one type of vehicle body compartment to which the delivery body of the invention may be applied.

Before installing the improved delivery body, the compartment door 14 of the vehicle is unlocked and disposed in the raised or open position (Fig. 1). Next, the right and left side members 25 and 26, respectively, are placed with their lower arcuate edges 27 in the arcuate side rain channels 16, the upper arcuate edges 28 thereof being received in the inverted U-shaped arcuate channels 23 of the door 14. Thereafter, a rectangular rear panel of suitable dimensions and design may be placed in position with its lower edge, for example 29, disposed within the rear rain channel 18 of the vehicle compartment. The upper edge 30 of said rear panel may abut the ledge 24 of the door 14 and be secured therein by means of a keeper 31 of suitable design for cooperation with the hooked end 19 of the door latch. The latch may be locked in this position (Figs. 8 and 9), thereby holding the side and rear members or panels of the delivery body in position. It should be noted that the locking of the rear panel in position precludes removal of the side panels, as the straight rear edges 32 of the side panels abut the inner face 33 of the rear panel along the side vertical edges 34 thereof. The side members 25 and 26 are substantially triangular in shape.

At 35 is indicated a ventilator opening in one or both of the side members, which opening may have associated therewith an air deflector 36 adapted to direct air into the compartment 13 while the vehicle is in motion. This may be applied to the delivery body when used for conveying live stock or perishable farm produce or the like, and under such circumstances a screened rear panel such as 37 or 38 may be preferred. It will readily be understood that circumstances will determine the type of rear panel to be employed, and by way of example several are illustrated and described herein. Panel 37 is completely screened, as shown. Panel 38 may have doors 39 opening outwardly on hinges 40, and these doors may be screened as at 41, or paneled as at 42. Suitable lock and handle members are indicated at 43 and 44. If desired, sliding doors 45 (Fig. 7) may be provided, and they may be constructed, and supported on the rear panel, in any practical manner.

The delivery body, or parts thereof, may be of any material such as wood, fiber, compressed paper, metal or any other material that can be worked to the shapes and dimensions required. The various panels may be of one-piece construction, or built up and braced as shown in Figs. 1 and 4.

By means of the construction shown in Fig. 10, the delivery body may be secured in position in a manner similar to that described herein, though the vehicle compartment be without rain channels. In the modified construction of Fig. 10, 46 represents a rain channel secured to the side member 25 and curved so as to conform with the curve of the vehicle body along the compartment side edges. The rain channel may be secured to the side member by tacks or screws 47, or by any other suitable means. If desired, a strip 48 of leather or other soft material, may be applied to the under side of the channel and positioned so as to rest upon the material of the vehicle body 49, without injury to the finish thereon. In this modified form of the invention, the rear panel precludes removal of the side members, just as in the construction illustrated in Fig. 1, and the compartment door cooperates with the side members in a like manner. As is clearly shown in Figs. 2 and 7, those edges of the side and back panels which rest within the rain channels, may be grooved as at 50 to permit flow of water along the channels.

In Fig. 11 is shown a box type of delivery body 51 having the rain channels 46 applied thereto as in Fig. 10. The body 51 has a bottom 52 which rests upon and is bolted or otherwise secured to a transverse brace 53 secured with the body as at 54. The forward part of the body is secured to the body also as at 55 by means of a brace or strap 56. Cover 14, it should be noted, is removed from the vehicle. In this modification, the weight, or a substantial part of it, is borne by the brace 53, and the channels 46 may be padded as in Fig. 10.

Referring now to Figs. 1 and 5, it is to be noted that the sides 25 and 26 have, at the juncture of edges 27 and 32, a depending lug or extension 58 which fits in the main channel 18 with the back panel. This provides a sturdy and rigid abutment between the side and rear panels. Also, a turnbuckle structure 59 may be provided, if desired, to hold the cover 14 down upon the top arcuate edges of the side members, but this additional bracing means is ordinarily not required.

It is to be understood that various modifications and changes in structural details of the device may be made, within the scope of the claims without departing from the spirit of the invention.

What is claimed is:

1. The combination with a vehicle body having a compartment provided with side rain channels, of a quick detachable delivery body comprising side members supported in said rain channels.

2. The combination with a vehicle body having a compartment provided with side rain channels, of a quick detachable delivery body comprising substantially triangular side members supported in said rain channels.

3. The combination with a vehicle body having a compartment provided with side rain channels and a rear transverse rain channel, of a quick detachable delivery body comprising side wall members and a rear wall member supported in said channels.

4. The combination with a vehicle body having a compartment provided with side rain channels and a rear transverse rain channel, of a quick detachable delivery body comprising side wall members and a rear wall member supported in said channels, and means for rigidly securing the rear wall member to a part of the vehicle to hold the side wall members in position.

5. The combination with a vehicle body having a compartment provided with side rain channels and a rear transverse rain channel of a quick detachable delivery body comprising side wall members and a rear wall member supported in said channels, and means for rigidly securing the top edge of the rear wall member to a part of the vehicle to hold the side wall members in position.

6. The combination with a vehicle body having a compartment provided with side rain channels and a hinged cover for the compartment, of a quick detachable delivery body comprising a pair of side members each having an upper and a lower edge, the upper edges being in abutment with the cover and the lower edges disposed within the rain channels, a rear panel supported by the vehicle body in abutment with each side member, and cooperative means on the cover and rear panel for maintaining the sides and rear panel in position.

7. The combination with a vehicle body having a compartment provided with side rain channels and a hinged cover for the compartment, of a quick detachable delivery body comprising a pair of side members each having an upper and a grooved lower edge, the upper edges being in abutment with the cover and the lower edges disposed within the rain channels, a rear panel supported by the vehicle body in abutment with each side member, and cooperative means on the cover and rear panel for maintaining the sides and rear panel in position.

8. The combination with a vehicle body having a compartment provided with side rain channels and a rear transverse rain channel, of a quick detachable delivery body comprising side wall members and a rear wall member supported in said channels, and means for rigidly securing the rear wall member to a part of the vehicle to hold the side wall members in position, and a ventilator for the compartment carried by one of the side wall members.

9. The combination with a vehicle body having a compartment provided with arcuate side rain channels and a transverse rear rain channel, and a hinged cover for the compartment having a latch thereon and arcuate opposed inverted channels disposed substantially in a vertical plane with the side rain channels, of a delivery body comprising a pair of side members each having an arcuate top edge, an arcuate bottom edge, and a rear edge, the arcuate top edges being received in the inverted channels of the cover and the arcuate bottom edges being received in the arcuate side rain channels, a rear panel having a lower edge and an upper edge the lower edge resting in the transverse rear rain channel of the compartment, and means adjacent the upper edge thereof for cooperation with the latch of the cover for holding the rear panel in abutment with the rear edges of the side members.

10. As a new article of manufacture a side member for a quick detachable vehicle body comprising a substantially triangular panel having a pair of arcuate edges, one of which is grooved longitudinally.

11. As a new article of manufacture a side member for a quick detachable vehicle body comprising a substantially triangular panel having a pair of arcuate convergent edges.

12. As a new article of manufacture a side member for a quick detachable vehicle body comprising a panel and a rain channel secured to the outer face of the panel and adapted to rest upon a vehicle body adjacent the rear compartment of said body.

13. The combination with a vehicle body having a compartment at the rear thereof said compartment being bounded on opposite sides by arcuate sides of the vehicle body, of a delivery body having a bottom and sides, arcuate water conveying channels secured to the sides of the body and adapted to rest on the arcuate portions of the vehicle body, and cooperative means on the vehicle body and the delivery body for holding the channels in position relative the arcuate portions of the vehicle body.

In testimony whereof, I have hereunto subscribed my name this 22nd day of November, 1930.

SAMUEL L. TAYLOR.